Sept. 17, 1968        L. SCHAFER        3,401,649
TWOFOLD PASTRY MAKING DEVICE
Filed March 17, 1967
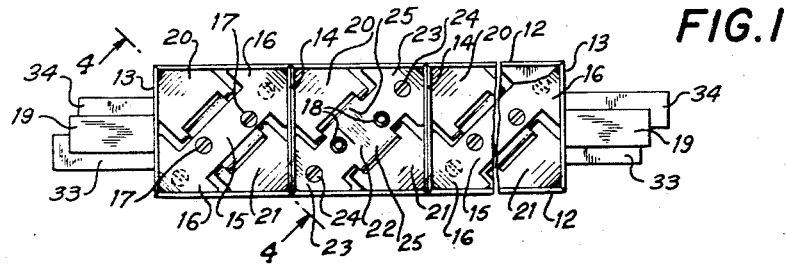
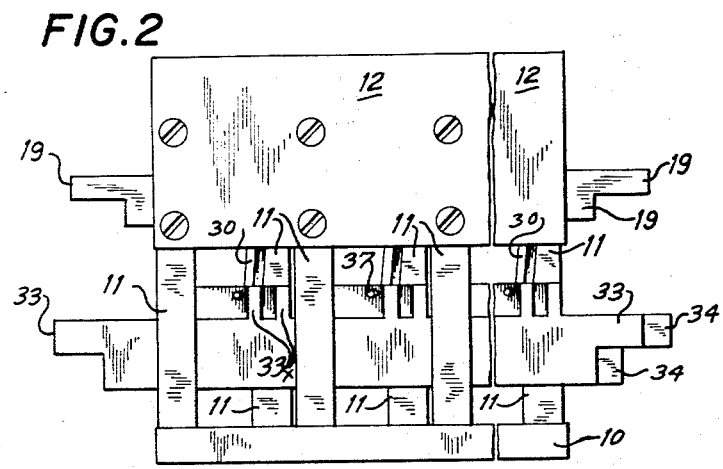
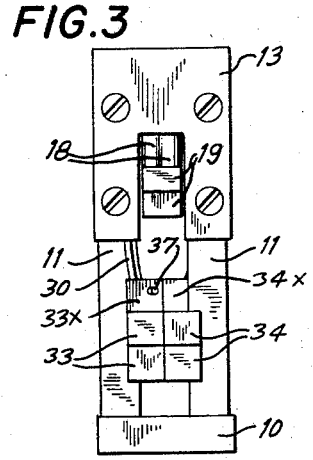
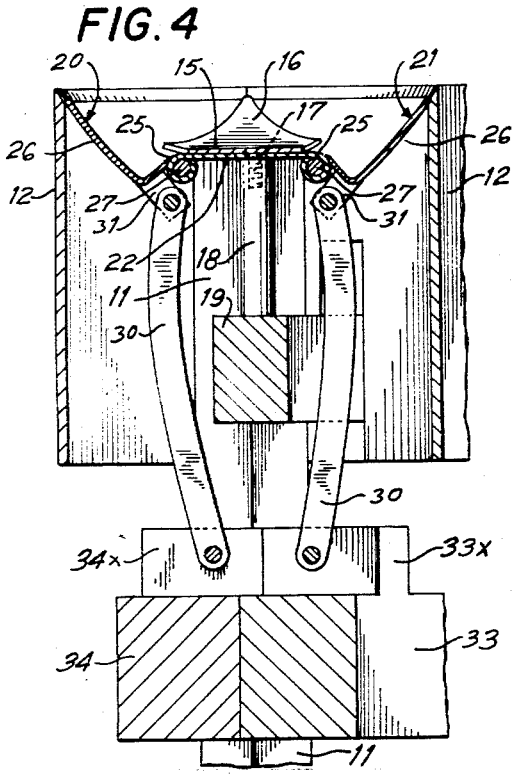
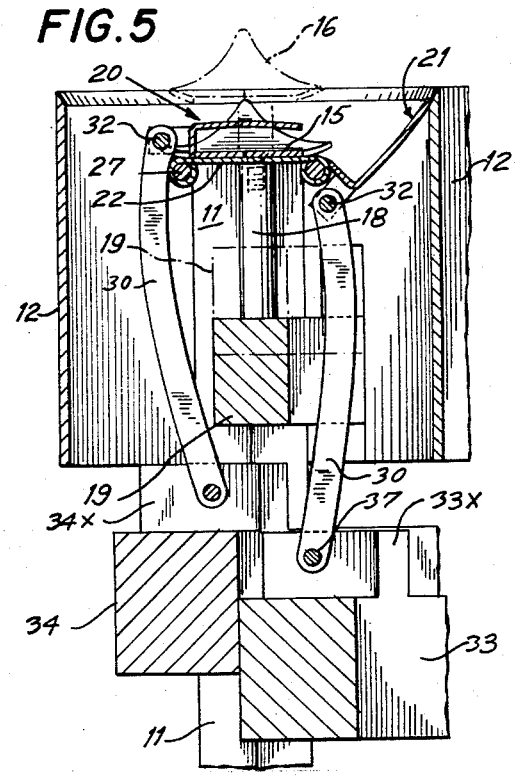

United States Patent Office 3,401,649
Patented Sept. 17, 1968

3,401,649
TWOFOLD PASTRY MAKING DEVICE
Leonhard Schafer, 219 Miriam Ave.,
Bronx, N.Y. 10458
Filed Mar. 17, 1967, Ser. No. 624,039
3 Claims. (Cl. 107—9)

ABSTRACT OF THE DISCLOSURE

A device for double folding cut pastry dough having a filling thereon. The cut dough falls onto a flat plate and opposite corners are then folded over by the successive operation of opposing folder arms. Thereafter the folded product is elevated for ease of removal from the device.

---

This invention is illustrated in the accompanying drawing in which;

FIG. 1 is a top view of the device, broken away in part, and showing a plurality of individual linearly disposed pastry folding cells, FIG. 2 is a side view of the device of FIG. 1 showing the various hand operated lifter beams used to produce a folding of the pastry and to lift the folded product, FIG. 3 is an end view of the device showing the operating lifter beams as seen from this viewpoint, FIG. 4 is a section view taken on line 4—4 of FIG. 1 and showing the normal position of the folder plates when at rest and the manner of actuating said opposing folder plates and FIG. 5 is a section view similar to that of FIG. 4 and showing one of the folder plates in an actuated folded-over position and showing in dotted outline the position of the lifter plate for removal of a folded pastry unit.

Turning to the drawing, a metal base plate 10 is provided with a plurality of suitably located rectangular upright supports or pillars 11 welded thereto. A side plate 12 is provided with apertures and bolted to each side of the device to threaded cavities in the supports 11. Opposing end plates 13 are similarly bolted to the ends of the respective pillars 11.

Spacer plates 14 are welded to the opposing sides 12 to form a plurality of square cells. The topmost edges of plates 12, 13 and 14 are cut on an angle to form a knife edge, so that when a blanket of pastry dough is placed thereon, it will be cut into squares by the rolling pressure of a rolling pin thereagainst.

The cut squares of dough fall by gravity into the respective cells upon a lifter plate 15, said plate 15 having upwardly curved opposing arrow head ends 16 and a pair of apertures in the flat center portion for bolting screws 17 to the underlying posts 18 secured to the hand operated lifter 19. Posts 18 are slidable through holes in stationary plate 22. The lifter 19 extends from end to end and lifts all plates 15 of the many cells simultaneously.

The cut dough falls onto plates 15 of the respective cells. It is then folded over by successive operation of the opposing folder arms 20 and 21.

As shown in FIGS. 1, 4 and 5, the folder arms 20 and 21 are hinged to a stationary metal plate 22 having flat opposing arrow heads 23, said plate 22 being bolted to the threaded cavities disposed in the tops of the respective pillars 11 by bolts 21 (FIG. 1, second cell from left, wherein the lifter plate 15 is removed to show the stationary plate 22 therebelow).

The stationary plate 22 is provided with opposing suitably rolled over hinge pin receiving portions 25. As shown in FIG. 4, the folder arms 20 and 21 are identical and are provided with triangular portions 26 which are bent upwardly in order to nest into a cell corner.

The base line of each folder arm 20 and 21 is also suitably rolled over at opposing ends of the line, in order to straddle the rolled over portion of plate 22, and to receive a hinge pin 27 disposed through the rolled over portions of the folder arm and the portion 25 of the plate 22.

In order to actuate the respective folder arms 20 and 21 a lever arm 30 is hinged to a suitable stub 31 welded to each folder arm. A hinge pin 32 permits the lever 30 to turn a respective folder arm over the superimposed plates 22 and 15 (FIG. 5) upon suitable actuation.

To actuate each lever 30 separately, the base of each of the levers 30 is hinged to a respective manually operated lifting bar 33 and 34. All the lifting bars 19, 33 and 34 are provided with conventional set backs at their ends thereof to permit ease of handling. Of course, in production the bars 19, 33 and 34 are operated in timed sequence by use of conventional mechanical means.

In order to secure the base of a respective lever 30 to a respective lifting bar 33 or 34, each bar is provided with a plurality of pairs of suitably spaced apart lugs 33X and 34X. The respective lever 30 is disposed inbetween a pair of lugs 33X or 34X and hingedly secured thereto by hinge pins 37.

Preferably the lugs 33X and 34X are cut at an angle to the integral bar, since the levers 30 operate folding arms 20 and 21, which arms are disposed at an angle relative to the bars (FIG. 1).

I claim:
1. A twofold pastry making device comprising a base; a plurality of spaced apart upright supports secured thereto and forming a cell; plates secured to said supports about said cell; a stationary plate secured within a cell to the top of opposing supports, said plate having rolled over opposing portions, each adapted to receive a hinge pin; a pair of substantially triangular folder arms, each having rolled over portions at their base line and adapted to coact with the rolled over portions of said stationary plate and said hinge pin; a stub portion secured to the back surface of each folder arm; a lever arm hingedly secured at its top end to each of said stub portions; lifter bar means secured to the bottom ends of said lever arms for rotating said folder arms about said hinge pins; a movable lifter plate disposed above said stationary plate and lifter means for lifting said lifter plate and a folded pastry unit thereon above the cell walls.

2. The device of claim 1 comprising a plurality of cells each having vertical cell side walls having top knife edges for cutting pastry dough, said lifter plate having triangular ends for ease of removal of folded pastry.

3. The device of claim 2 wherein the rolled over portions of each folder arm are suitably spaced apart sections adapted to straddle the rolled over portion of said stationary plate and to receive said pin therein.

References Cited

UNITED STATES PATENTS

| 628,449 | 7/1899 | Carr | 107—54 |
| 2,055,726 | 9/1936 | Moss | 107—8 XR |
| 2,574,548 | 11/1951 | Deutsch | 107—9 |
| 2,747,521 | 5/1956 | Gardner | 107—9 XR |
| 2,969,025 | 1/1961 | Schafer | 107—8 |
| 3,257,973 | 6/1966 | Schafer | 107—9 |

WALTER A. SCHEEL, *Primary Examiner.*

A. O. HENDERSON, *Assistant Examiner.*